United States Patent
Kim et al.

(10) Patent No.: US 9,247,005 B2
(45) Date of Patent: Jan. 26, 2016

(54) MOBILE TERMINAL, IMAGE DISPLAY APPARATUS MOUNTED IN CAR AND DATA PROCESSING METHOD USING THE SAME

(75) Inventors: Jungwoo Kim, Seoul (KR); Sungha Choi, Seoul (KR); Mingoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 555 days.

(21) Appl. No.: 13/544,547

(22) Filed: Jul. 9, 2012

(65) Prior Publication Data

US 2013/0138265 A1  May 30, 2013

Related U.S. Application Data

(60) Provisional application No. 61/563,838, filed on Nov. 28, 2011.

(51) Int. Cl.
| | |
|---|---|
| *G06F 17/00* | (2006.01) |
| *H04L 29/08* | (2006.01) |
| *B60K 35/00* | (2006.01) |
| *B60K 37/00* | (2006.01) |

(52) U.S. Cl.
CPC ............... *H04L 67/12* (2013.01); *B60K 35/00* (2013.01); *B60K 37/00* (2013.01); *B60K 2350/1004* (2013.01); *B60K 2350/1056* (2013.01); *B60K 2350/352* (2013.01); *B60K 2350/355* (2013.01); *B60K 2350/357* (2013.01)

(58) Field of Classification Search
CPC .......... H04L 67/12; B60K 2350/1056; B60K 2350/357; B60K 2350/1004; B60K 2350/352
USPC .......................................................... 701/1
See application file for complete search history.

(56) References Cited

U.S. PATENT DOCUMENTS

| 6,463,343 | B1 * | 10/2002 | Emens | ............... G05B 19/042 |
| --- | --- | --- | --- | --- |
| | | | | 382/115 |
| 6,975,635 | B2 * | 12/2005 | Takeyama et al. | ............. 370/401 |
| 9,116,658 | B2 * | 8/2015 | Kim | ......................... G06F 3/147 |
| 2002/0029256 | A1 * | 3/2002 | Zintel | ................. H04L 12/2803 |
| | | | | 709/218 |
| 2002/0180579 | A1 * | 12/2002 | Nagaoka | ............. H04L 12/2803 |
| | | | | 340/3.1 |
| 2004/0158823 | A1 * | 8/2004 | Saint-Hilaire | ........ G06F 9/4413 |
| | | | | 717/140 |

(Continued)

FOREIGN PATENT DOCUMENTS

| EP | 2 254 034 A2 | 11/2010 |
| --- | --- | --- |
| JP | 07105494 A * | 4/1995 |

(Continued)

*Primary Examiner* — Tuan C. To
(74) *Attorney, Agent, or Firm* — Birch, Stewart, Kolasch & Birch, LLP

(57) ABSTRACT

An image display apparatus mounted in a car includes a communication unit configured to transmit and receive data to and from a mobile terminal, and a controller configured to control the communication unit to receive information for requesting status information of the car, in which the image display apparatus is mounted, from the mobile terminal, to generate car status information according to the received information for requesting the status information of the car, to control the communication unit to transmit the generated car status information to the mobile terminal. The car status information includes at least one of driving information, speed information and fuel information of the car. According to a mobile terminal, an image display apparatus mounted in a car and a data processing method using the same, it is possible to efficiently transmit car status information between the mobile terminal and the image display apparatus.

16 Claims, 17 Drawing Sheets

(56) References Cited

U.S. PATENT DOCUMENTS

| | | |
|---|---|---|
| 2006/0293813 A1 | 12/2006 | Nou |
| 2007/0118274 A1 | 5/2007 | Orebaugh |
| 2009/0306834 A1* | 12/2009 | Hjelm et al. ............. 701/1 |
| 2010/0094928 A1* | 4/2010 | Nakamura ............. 709/203 |
| 2011/0021213 A1 | 1/2011 | Carr |
| 2011/0098916 A1* | 4/2011 | Jang ............. G01C 21/3697 701/533 |
| 2011/0116419 A1* | 5/2011 | Cholas ............. H04M 3/533 370/259 |
| 2011/0187513 A1* | 8/2011 | Taki et al. ............. 340/13.25 |
| 2011/0205944 A1* | 8/2011 | Miyabayashi ...... H04L 63/0492 370/310 |
| 2011/0304447 A1* | 12/2011 | Marumoto ............. 340/438 |
| 2012/0139951 A1* | 6/2012 | Hwang ............. G06F 3/04883 345/665 |
| 2012/0159340 A1* | 6/2012 | Bae ............. G06F 3/0488 715/738 |
| 2012/0242473 A1* | 9/2012 | Choi ............. B60W 50/14 340/441 |

FOREIGN PATENT DOCUMENTS

| | | | | |
|---|---|---|---|---|
| JP | EP 2048046 A1 * | 4/2009 | ............. | B60R 25/04 |
| KR | WO 2008143438 A1 * | 11/2008 | ............. | H04M 1/6075 |

* cited by examiner

FIG. 6

| Extension-Type | Message Name | Origin | Server Support | Client Support |
|---|---|---|---|---|
| 0 | ByeBye | Server | MUST | MUST |
| 0 | ByeBye | Client | MUST | MUST |
| 1 | Server Display Configuration | Server | MUST | MUST |
| 2 | Client Display Configuration | Client | MUST | MUST |
| 3 | Server Event Configuration | Server | MUST | MUST |
| 4 | Client Event Configuration | Client | MUST | MUST |
| 5 | Event Mapping | Server | MUST | MAY |
| 6 | Event Mapping Request | Client | MUST | MAY |
| 7 | Key Event Listing | Server | SHOULD[3] | MAY[4] |
| 8 | Key Event Listing Request | Client | SHOULD[5] | MAY[6] |
| 9 | Virtual Keyboard Trigger | Server | SHOULD[3] | MAY[4] |
| 10 | Virtual Keyboard Trigger Request | Client | SHOULD[5] | MAY[6] |
| 11 | Device Status | Server | MUST | SHOULD |
| 12 | Device Status Request | Client | MUST | SHOULD |
| 13 | Content Attestation Response | Server | SHOULD | SHOULD |
| 14 | Content Attestation Request | Client | SHOULD | SHOULD |
| 16 | Framebuffer Blocking Notification | Client | MUST | MUST |
| 18 | Audio Blocking Notification | Client | MUST | MUST |
| 20 | Touch Event | Client | SHOULD[5] | SHOULD[4,6] |
| 21 | Framebuffer Alternative Text | Server | MAY | MAY |
| 22 | Framebuffer Alternative Text Request | Client | MAY | MAY |
| 23 | Car Status | Client | MAY | MAY |
| 24 | Car Status Request | Server | MAY | MAY |

FIG. 7

| # bytes | Type | Value | Description |
|---|---|---|---|
| 1 | U8 | 128 | Message - type |
| 1 | U8 | 23 | Extension - type |
| 2 | U16 | 2 | Payload length |
| 2 | U16 | Value | Car Status |
| | | 0 | No Driving |
| | | 1 | Driving |

FIG. 8

| # bytes | Type | Value | Description |
|---|---|---|---|
| 1 | U8 | 128 | Message-type |
| 1 | U8 | 23 | Extension-type |
| 2 | U16 | 4 | Payload length |
| 2 | U16 | Bit | Car Status (1 = yes, 0 = no) |
| | | [0] | Driving |
| | | [1] | Fasten Seating belt |
| | | [2] | Side Break |
| | | [3] | Head-light |
| | | [5:4] | Current Speed (00 = under 20km, 01 = 20 ~ 40km, 10 = 40 ~ 60km, 11 = upper 60km) |
| | | [7:6] | Fuel (00 = empty, 01 = low, 10, = mid, 11 = high) |
| | | [9:8] | Transmission (00 = P, 01 = N, 10 = D, 11 = R) |
| | | [12:10] | Door Number (000 ~ 111 = MAX 8 door) |
| | | [15:13] | Reserved |
| 1 | U8 | Bit | Door Lock Status (1 = Unlock, 0 = Lock) |
| | | [7:0] | Door Index |
| 1 | U8 | Bit | Window Status (1 = Open, 0 = Close) |
| | | [7:0] | Window Index |

FIG. 9

| # bytes | Type | Value | Description |
|---|---|---|---|
| 1 | U8 | 128 | Message - type |
| 1 | U8 | 24 | Extension - type |
| 2 | U16 | 0 | Payload length |

FIG. 12

| Variable Name | Description | Req. or Opt. | Data Type | Allowed Value | Default Value | Eng. Units |
|---|---|---|---|---|---|---|
| CarStatusUpdated | A string formatted as UTF-8 representing the list of status types of car information whose status has changed | R | string | Undefined | Empty string | N/A |
| A_ARG_TYPE_CarStatus | A string formatted as UTF-8 XML specifying current car status | R | string | Undefined | Empty string | N/A |
| A_ARG_TYPE_ProfileID | A unsigned 32-bit integer representing a unique profile identifier. | R | ui4 | Undefined | 0 | N/A |
| A_ARG_TYPE_String | A simple string type (UTF-8) | R | string | Undefined | Empty string | N/A |
| A_ARG_TYPE_INT | A simple unsigned 32-bit integer represented in decimal (based 10) format | R | ui4 | Undefined | 0 | N/A |
| A_ARG_TYPE_Bool | A simple Boolean string which can either have the value 'true' or 'faslse' | R | string | true \| false | false | N/A |

FIG. 13

| Element | Description | Parent | Availability |
|---|---|---|---|
| CarStatus | Status information about the car | - | Required |
| DrivingMode | Describes a driving mode. If it is set to true, driving mode. (A_ARG_TYPE_Bool) | CarStatus | Required |
| Speed | Current speed (A_ARG_TYPE_INT) | CarStatus | Optional |
| Transmission | Current transmission status. P=0, N=1, D=2, and R=3 (A_ARG_TYPE_INT) | CarStatus | Optional |
| SideBreak | Current side break status (A_ARG_TYPE_Bool) | CarStatus | Optional |
| Head - light | Current head - light status (A_ARG_TYPE_Bool) | CarStatus | Optional |
| Fuel | Current fuel status in percentages (A_ARG_TYPE_String) | CarStatus | Optional |
| SeatBelt | Seat belt status (000~111, MAX 8 doors) (A_ARG_TYPE_String) | CarStatus | Optional |
| DoorLock | Door lock status. (000~111, MAX 8 doors) (A_ARG_TYPE_String) | CarStatus | Optional |

FIG. 14

| Name | Device R/O | Control Point R/O |
|---|---|---|
| GetCarStatusTypes | R | O |
| SetCarStatusTypes | R | O |
| GetCarStatus | R | O |

FIG. 15

| Argument | Description | Direction | relatedStateVariable |
|---|---|---|---|
| StatusTypeFilter | Car information type filter. If set to "*" or empty string, all elements and attributes and their values should be returned. | IN | A_ARG_TYPE_String |
| ProfileID | The identifier of the profile being used | IN | A_ARG_TYPE_ProfileID |
| StatusTypes | Returns a list of car information types which are available from the car | OUT | A_ARG_TYPE_String |

FIG. 16

| Argument | Description | Direction | relatedStateVariable |
|---|---|---|---|
| StatusTypes | a list of car information types that the control point would like to subscribed | IN | A_ARG_TYPE_String |
| ProfileID | The identifier of the profile being used | IN | A_ARG_TYPE_ProfileID |
| StatusTypesResult | Returns a list of car information types that will be published from the controlled device | OUT | A_ARG_TYPE_String |

FIG. 17

| Argument | Description | Direction | relatedStateVariable |
|---|---|---|---|
| StatusTypeFilter | Car information type filter. If set to "*" or empty string, all elements and attributes and their values should be returned. | IN | A_ARG_TYPE_String |
| CarStauts | Returns car information types and those values at the time when this action is requested. | OUT | A_ARG_TYPE_CarStatus |

MOBILE TERMINAL, IMAGE DISPLAY APPARATUS MOUNTED IN CAR AND DATA PROCESSING METHOD USING THE SAME

This application claims the benefit of U.S. Provisional Patent Application No. 61/563,838 filed on, Nov. 28, 2011 which is hereby incorporated by reference as if fully set forth herein.

BACKGROUND OF THE INVENTION

1. Field of the Invention

The present invention relates to a mobile terminal, an image display apparatus mounted in a car and a data processing method using the same, and more particularly, to a mobile terminal, an image display apparatus mounted in a car and a data processing method using the same, which are capable of efficiently transmitting and receiving status information of a car in which the image display apparatus is mounted.

2. Discussion of the Related Art

An image display apparatus displays image information using a screen. An image display apparatus mounted in a car provides a user with a car information display function, a navigation function, a TV broadcast display function, etc. Recently, with technical development, an image display apparatus mounted in a car is connected to a mobile terminal possessed by a user over a wired/wireless network, thereby performing data communication.

Accordingly, an image display apparatus mounted in a car and a mobile terminal can transmit and receive car status information such as car driving mode, speed, fuel quantity, etc. to and from each other through data communication. That is, car status information is transmitted from one device to another device such that the devices share the car status information. Therefore, there is a need for a data processing method for efficiently transmitting car status information between devices so as to share car status information between an image display apparatus and a mobile terminal.

SUMMARY OF THE INVENTION

Accordingly, the present invention is directed to a mobile terminal, an image display apparatus mounted in a car and a data processing method using the same that substantially obviate one or more problems due to limitations and disadvantages of the related art.

An object of the present invention is to provide a mobile terminal, an image display apparatus mounted in a car and a data processing method using the same, which are capable of defining car status information transmitted between devices and efficiently transmitting car status information between the devices so as to share the car status information between the image display apparatus mounted in a car and the mobile terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an image display apparatus mounted in a car includes a communication unit configured to transmit and receive data to and from a mobile terminal, and a controller configured to control the communication unit to receive information for requesting status information of the car, in which the image display apparatus is mounted, from the mobile terminal, to generate car status information according to the received information for requesting the status information of the car, to control the communication unit to transmit the generated car status information to the mobile terminal. The car status information includes at least one of driving information, speed information and fuel information of the car.

The controller may control the communication unit to generate and transmit the car status information to the mobile terminal, if the status of the car is changed.

The controller may control the communication unit to generate and transmit only changed car status information to the mobile terminal if the status of the car is changed.

The car status information may further include transmission information, brake lock/unlock information and headlight on/off information of the car.

The car status information may further include information on whether a seat belt is fastened, information on whether a door is locked and information on whether a window is opened.

The controller may control the communication unit to receive first type information including a list of the car status information requested by the mobile terminal and generates the car status information according to the type information.

The controller may control the communication unit to generate and transmit, to the mobile terminal, second type information including a list of car status information capable of being generated.

The car status information may include identification of the car status information.

In another aspect of the present invention, a mobile terminal includes a communication unit configured to transmit and receive data to and from an image display apparatus, and a controller configured to generate information for requesting status information of a car mounted in the image display apparatus, to control the communication unit to transmit the generated information for requesting the status information of the car, and to control the communication unit to receive car status information generated according to the information for requesting the status information of the car. The car status information includes at least one of driving information, speed information and fuel information of the car.

The controller may control the communication unit to receive the car status information from the image display apparatus, if the status of the car is changed.

The controller may control the communication unit to receive only changed car status information from the image display apparatus if the status of the car is changed.

The car status information may further include transmission information, brake lock/unlock information and headlight on/off information of the car.

The car status information may further include information on whether a seat belt is fastened, information on whether a door is locked and information on whether a window is opened.

The controller may generate first type information including a list of the car status information requested by the mobile terminal and controls the communication unit to transmit the first type information to the image display apparatus.

The controller may control the communication unit to receive second type information including a list of car status information capable of being generated from the image display apparatus.

The car status information may include identification of the car status information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 is a diagram showing a VNC extension message according to a first embodiment of the present invention;

FIG. 7 is a diagram showing a car status message according to a first embodiment of the present invention;

FIG. 8 is a diagram showing an extended car status message according to a first embodiment of the present invention;

FIG. 9 is a diagram showing a car status request message according to a first embodiment of the present invention;

FIG. 12 is a diagram showing status variables according to a second embodiment of the present invention;

FIG. 13 is a diagram showing CarStatus variables according to a second embodiment of the present invention;

FIG. 14 is a diagram showing actions of a UPnP service according to a second embodiment of the present invention;

FIG. 15 is a diagram showing a "GetCarStatusTypes" action according to a second embodiment of the present invention;

FIG. 16 is a diagram showing a "SetCarStatusType" action according to a second embodiment of the present invention; and FIG. 17 is a diagram showing a "GetCarStatus" action according to a second embodiment of the present invention.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, an image processing in an image display apparatus mounted to a car according to the present invention will be explained in more detail with reference to the attached drawings. The suffixes attached to components, such as 'module' and 'unit or portion' were used for facilitation of the detailed description of the present invention. Therefore, the suffixes do not have different meanings from each other.

Figure 1:
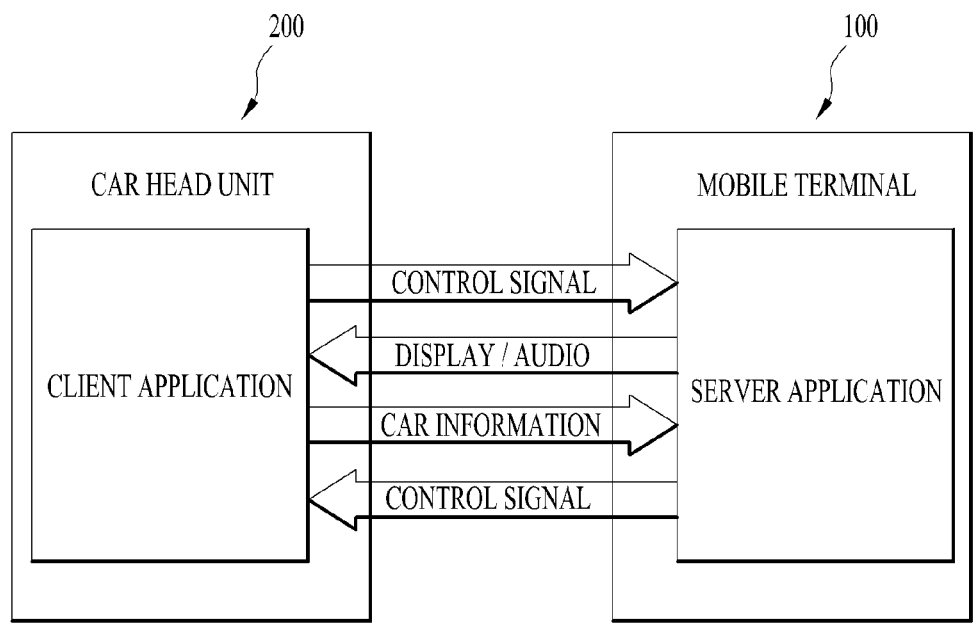
FIG. 1 is a schematic diagram of a data processing system including an image display apparatus mounted in a car and a mobile terminal according to an embodiment of the present invention.

FIG. 1 is a view schematically illustrating a data processing system including a mobile terminal and an image display apparatus according to a first embodiment of the present invention.

As shown in FIG. 1, a data processing system according to a first embodiment of the present invention comprises a mobile terminal 100 and an image display apparatus 200.

The mobile terminal 100 may be connected to the image display apparatus 200 in a wired or wireless manner, and transmit at least one of a video signal and an audio signal to the image display apparatus 200.

The image display apparatus 200 is mounted to a car in a fixed manner, and may be connected to the mobile terminal 100 in a wired or wireless manner to receive at least one of a video signal and an audio signal from the mobile terminal 100. And, the image display apparatus 200 may output at least one of a video signal and an audio signal received from the mobile terminal 100.

The image display apparatus 200 may receive an input from a user, and transmit the received input to the mobile terminal 100. For instance, once a user performs a touch input through a touch screen of the image display apparatus 200, the image display apparatus 200 may recognize a position where the touch input has been performed on a screen image, and may transmit information on the recognized position to the mobile terminal 100.

The mobile terminal 100 may determine the occurrence of a touch event at a position where the touch input has been performed, and may execute an operation corresponding to the generated touch event. That is, the user may control an operation of the mobile terminal 100 by using a touch screen, a hard key, etc. of the image display apparatus 200.

As one example of a data processing system, a user executes a road guiding application (or dialing, phonebook, e-mail, moving image play application, etc.) installed at the mobile terminal 100. Then, the mobile terminal 100 transmits an execution image of the road guiding application to the image display apparatus 200 so that the execution image of the road guiding application can be displayed on the image display apparatus 200.

The user may view the execution image of the road guiding application on a large screen of the image display apparatus 200, rather than on a small screen of the mobile terminal 100. And, the user may hear a road guiding sound through a speaker of the car, rather than through a speaker of the mobile terminal 100.

Once the user selects a road guidance-related menu by using a touch screen or a hard key of the image display apparatus 200, the mobile terminal 100 may execute an operation corresponding to the menu. Then, the mobile terminal 100 may output an execution result with respect to the operation corresponding to the menu to the image display apparatus 200.

The mobile terminal 100 and the image display apparatus 200 may be connected to each other by using a short-range communication standard such as Bluetooth, a wireless internet standard such as Wi-Fi, an external device interface standard such as a universal serial bus (USB), and so on.

A server application for providing a service by a client' request may be installed at the mobile terminal 100, and a client application for accessing a service provided from a server may be installed at the image display apparatus 200.

The server application of the mobile terminal 100 is configured to capture a screen of the mobile terminal 100 regardless of an application type of the mobile terminal, and transmits the captured screen to the client application of the image display apparatus 200. And, the server application controls an operation of the mobile terminal 100 based on information received from the client application, the information on an event having occurred from the image display apparatus 200.

For instance, the image display apparatus 200 may remotely control the mobile terminal 100 in a virtual network computing (VNC) manner using a remote frame buffer (RFB) protocol which provides remote access with respect to graphical user interfaces. According to the VNC method, the mobile terminal 100 transmits a screen update to the image display apparatus 200 through a network, and transmits an event having occurred from the image display apparatus 200 to the mobile terminal 100.

And, the mobile terminal 100 may transmit an audio signal to the image display apparatus 200 or a headset or a hands-free, etc., according to an advanced audio distribution profile (A2DP) which defines a sound quality of an audio signal (stereo or mono) streamed to a second device from a first device through a Bluetooth connection, especially, a headset profile (HSP) relating to a Bluetooth headset, and a hands-free profile (HFP) applied to a hands-free for a car, etc.

The mobile terminal 100 and the image display apparatus 200 may exchange additional information with each other based on additional protocols. For instance, the image display apparatus 200 may provide, to the mobile terminal 100, information on a car status such as driving information, speed information and fuel information.

Applications installed at the mobile terminal 100 may be executed based on information on a car status received from the image display apparatus 200 by using additional protocols. These applications may provide, to the image display apparatus 200, information on an application type (e.g., road guidance, multimedia, game, etc.), a graphic user interface (GUI) type (e.g., map, video, menu, etc.), an application status (e.g., execution status in a foreground or a background).

Figure 2:
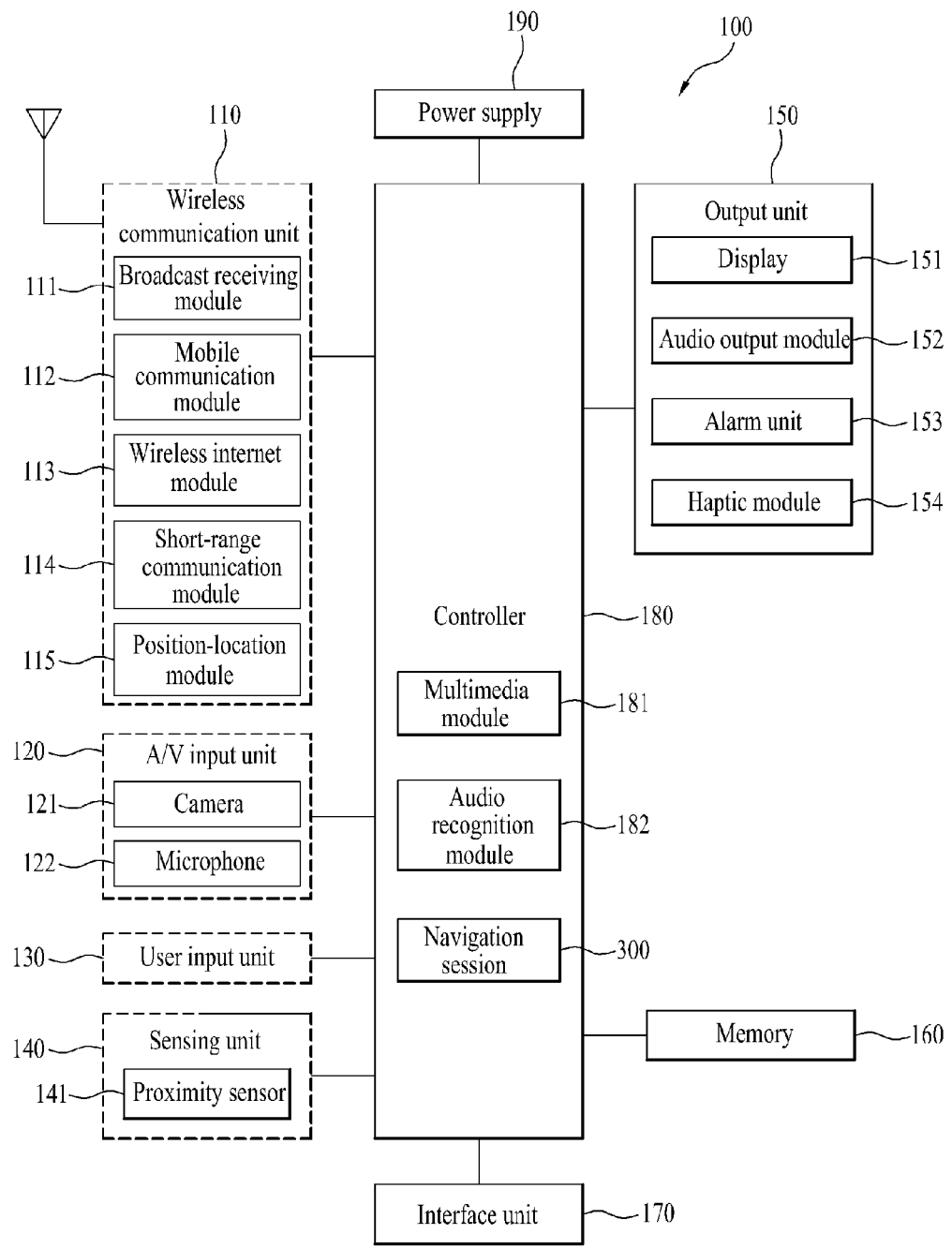
FIG. 2 is a diagram of a mobile terminal according to an embodiment of the present invention.

FIG. 2 is a block diagram illustrating a configuration of the mobile terminal 100 according to the present invention. The mobile terminal 100 may be configured in various manners. For instance, the mobile terminal 100 may be implemented as a portable phone, a smart phone, a notebook computer, a digital broadcasting terminal, personal digital assistants (PDA), a portable multimedia player (PMP), etc.

As shown in FIG. 2, the mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190. FIG. 2 illustrates the mobile terminal 100 having various components, but it is understood that implementing all of the illustrated components is not a requirement. The mobile terminal 100 may be implemented by greater or fewer components.

The wireless communication unit 110 includes one or more components allowing radio communication between the mobile terminal 100 and a wireless communication system or a network in which the mobile terminal is located. For example, the wireless communication unit 110 may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160 (or another type of storage medium).

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile communication terminal. For example, the location information module 115 may include a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. As the location information module 115, a Wi-Fi positioning system and/or a hybrid positioning system may be used.

The A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 detects a current status (or state) of the mobile terminal 100 such as an opened or closed state of the mobile terminal 100, a location of the mobile terminal 100, the presence or absence of user contact with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. The mobile terminal 100 may include two or more display units 151. For example, the mobile terminal may include both an external display unit (not shown) and an internal display unit (not shown).

When the display unit 151 and a sensor for sensing a touch operation (hereinafter, will be referred to as 'touch sensor') are overlaid in a layered manner to form a touch screen, the display unit 151 may function as both an input device and an output device. The touch sensor may be a touch film, a touch sheet, a touch pad, etc.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure. When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

The proximity sensor 141 may be arranged at an inner region of the mobile terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Accordingly, if the pointer is in proximity to the touch screen without contacting the touch screen, the position of the pointer and a distance between the pointer and the touch screen may be detected. Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm 153 outputs signals notifying the occurrence of events from the mobile terminal 100. The events occurring from the mobile terminal 100 may include call received, message received, key signal input, touch input, and so on. The alarm 153 may output not only video or audio signals, but also other types of signals such as signals notifying the occurrence of events in a vibration manner. For instance, the alarm 153 may be configured to vibrate responsive to the mobile terminal receiving a call or message. As another example, when a key signal has been inputted, the alarm 153 may output vibration as a feedback of the key signal input. Through this vibration output, a user may recognize the occurrence of an event. In order to output a signal in a vibration manner, the mobile terminal may be mounted with a vibrator. Here, the video signal or audio signal may be outputted through the display unit 151 or the audio output module 152.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100. For example, the haptic module 154 may be provided to a steering wheel, a gearshift, a lever, a seat, and the like.

The memory 160 may store a program for the processing and control of the controller 180. Alternatively, the memory 160 may temporarily store input/output data (e.g., phonebook data, messages, still images, video and the like).

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like. Here, the identification module may be a memory chip that stores various information for authenticating user's authority for using the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection mechanisms. The interface unit 170 may be used to receive inputs (e.g., data, information, power, etc.) from an external device and transfer the received inputs to one or more elements within the mobile terminal 100 or may be used to transfer data between the mobile terminal and an external device.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 serves to supply power to each component by receiving external power or internal power under control of the controller 180.

Processes described herein may be implemented in a computer-readable or its similar medium using, for example, software, hardware, or any combination thereof.

For hardware implementation, the processes may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units designed to perform the functions described herein. In some cases, such processes may be implemented by the controller 180.

For software implementation, the processes, such as procedures or functions, may be implemented together with separate software modules that allow performing of at least one function or operation. Software codes can be implemented by a software application (or program) written in any suitable programming language. The software codes may be stored in the memory 160 and executed by the controller 180.

An audio recognition module 182 is configured to recognize an audio signal generated from a user, and to execute a corresponding function according to the recognized audio signal.

A navigation session 300 applied to the mobile terminal 100 displays a travel path on map data.

Figure 3:
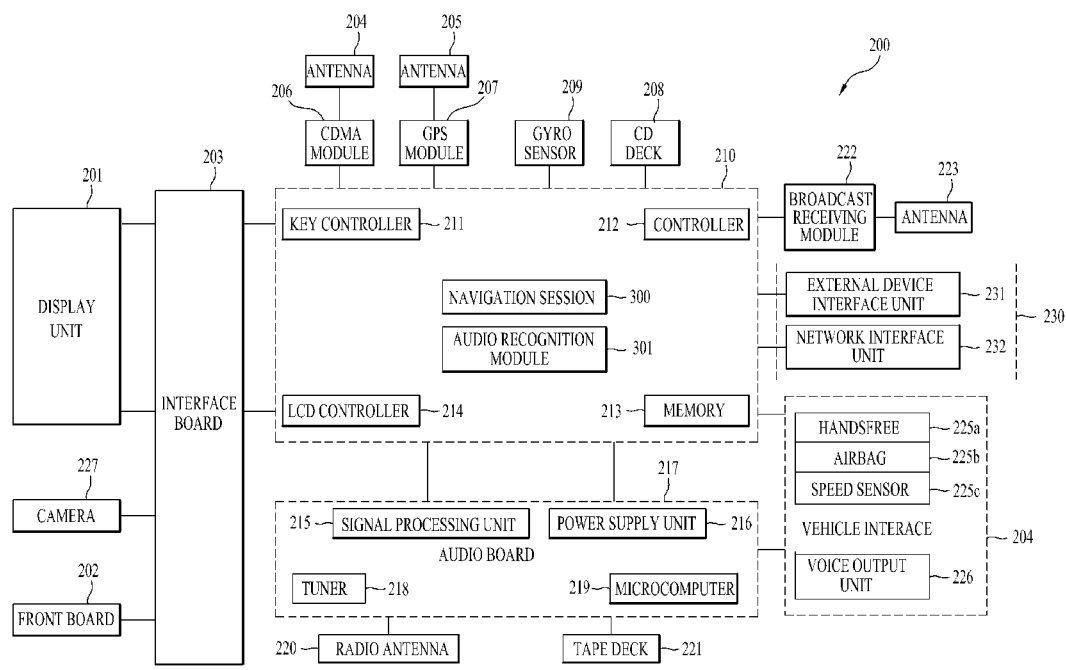
FIG. 3 is a diagram showing the configuration of an image display apparatus mounted in a car according to an embodiment of the present invention.

FIG. 3 is a block diagram illustrating a configuration of an image display apparatus 200 according to the present invention.

As shown in FIG. 3, the image display apparatus 200 comprises a main board 210 including a controller 212 configured to control an overall operation of the image display apparatus 200 (e.g., a central processing unit: CPU), a memory 213 configured to store therein programs for processing the controller 212 and input/output data, a key controller 211 configured to control each kind of key signals, and an LCD controller 214 configured to control a liquid crystal display (LCD).

The memory 213 may store therein map information (map data) for displaying road guidance information on a digital map. Also, the memory 213 may store therein a traffic information collection control algorithm for inputting traffic information according to a road condition in which a car is currently traveling, and information for controlling the algorithm.

To the main board 210, may be connected a CDMA (code division multiple access) module 206 provided with a unique device number and mounted in a car, a GPS module 207 configured to receive a GPS signal for guiding a position of a car and tracking a travel path from a starting point to a destination point or to transmit traffic information collected by a user in the form of a global positioning system (GPS) signal, a CD deck 208 configured to play a signal recorded in a compact disk (CD), a gyro sensor 209, etc. The CDMA module 206 and the GPS module 207 may transmit or receive signals through antennas 204 and 205.

A broadcast signal receiving module 222 may be connected to the main board 210, and may receive a broadcast signal through an antenna 223. To the main board 210, may be connected a display unit (LCD) 201 controlled by the LCD controller 214 through an interface board 203, a front board 202 controlled by the key controller 211, and a camera 227 configured to capture inside and/or outside of a car. The display unit 201 is configured to display each kind of video signals and text signals. The front board 202 is provided with buttons for inputting each kind of key signals, and supplies a key signal corresponding to a button selected by a user to the main board 210. And, the display unit 201 includes the proximity sensor and the touch sensor (touch screen) of FIG. 2.

The front board 202 may be provided with a menu key for directly inputting traffic information, and the menu key may be configured to be controlled by the key controller 211.

The audio board 217 is connected to the main board 210, and processes each kind of audio signals. The audio board 217 includes a micro computer 219 configured to control the audio board 217, a tuner 218 configured to receive a radio signal, a power unit 216 configured to supply power to the micro computer 219, and a signal processor 215 configured to process each kind of audio signals.

The audio board 217 includes a radio antenna 220 configured to receive a radio signal, and a tape deck 221 configured to play an audio tape. The audio board 217 may further include an audio output unit (e.g., amplifier) 226 configured to output an audio signal processed by the audio board 217.

The audio output unit (amplifier) 226 is connected to a car interface 224. That is, the audio board 217 and the main board 210 are connected to the car interface 224. To the car interface 224, may be connected to a hands-free unit 225a for inputting an audio signal, an air bag 225b for a passenger's safety, a speed sensor 225c for detecting a car speed, etc. The speed sensor 225c is configured to calculate a car speed and to provide information on the calculated car speed to the central processing unit 212.

The navigation session 300 applied to the image display apparatus 200 is configured to generate road guidance information based on map data and information on a current position of a car, and to provide the generated road guidance information to a user.

The display unit 201 is configured to detect a proximity touch in a display window through a proximity sensor. For instance, when a pointer (e.g., a finger or a stylus pen) executes a proximity touch, the display unit 201 detects a position where the proximity touch has occurred and output position information corresponding to the detected position to the controller 212.

An audio recognition device (or audio recognition module) 301 is configured to recognize an audio signal (voice) generated from a user, and to perform a corresponding function according to the recognized audio signal.

The navigation session 300 applied to the image display apparatus 200 displays a travel path on map data. When the mobile terminal 100 is within a preset distance from a blind spot included in the travel path, the navigation session 300 automatically forms a wireless network with a terminal mounted to a peripheral car (e.g., car navigation system) and/or a mobile terminal held by a passerby through a wireless communication network (e.g., short-range wireless communication network). This may allow the navigation session 300 to receive position information of the peripheral car from the terminal mounted to the peripheral car, and to receive position information of the passerby from the mobile terminal held by the passerby.

The main board 210 may be connected to the interface unit 230, and the interface unit 230 may include an external device interface unit 231 and a network interface unit 232.

The external device interface unit 231 may connect an external device to the image display apparatus 200. For this, the external device interface unit 231 may include an A/V input/output unit (not shown) or a wireless communication unit (not shown).

The external device interface unit 231 may be connected to an external device in a wired or wireless manner, the external device such as a DVD (Digital Versatile Disk), a Blu ray, a game player, a camera, a camcorder and a notebook computer. The external device interface unit 231 transmits, to the controller 212, a video signal or an audio signal or a data signal input from the outside through the connected external device. And, the video signal or the audio signal or the data signal processed by the controller 212 may be output to the connected external device.

The A/V input/output unit may include a USB terminal, a CVBS (Composite Video Banking Sync) terminal, a component terminal, an S-video terminal (analogue), a DVI (Digital Visual Interface) terminal, an HDMI (High Definition Multimedia Interface) terminal, an RGB terminal and a D-SUB terminal, so that an audio signal and a video signal of an external device are input to the image display apparatus 200.

The wireless communication unit may perform a short-range wireless communication with other electronic device.

For instance, the image display apparatus 200 may be connected to other electronic device through a network, according to a communication standard such as Bluetooth, RFID (Radio Frequency Identification), IrDA (infrared Data Association), UWB (Ultra Wideband), ZigBee and DLNA (Digital Living Network Alliance).

The external device interface unit 231 may be connected to various set-top boxes through one of the aforementioned terminals, thereby performing inputs and outputs with the set-top boxes.

The external device interface unit 231 may receive applications inside a neighboring external device or a list of applications, and transmit the received applications or list to the controller 212 or the memory 213.

The network interface unit 130 provides an interface for connecting the image display apparatus 100 to a wired/wireless network including an internet network. The network interface unit 130 may be provided with an Ethernet terminal for connection with a wired network, and may utilize communication standards such as WLAN (Wireless LAN)(Wi-Fi), Wibro (Wireless broadband), Wimax (World Interoperability for Microwave Access), and HSDPA (High Speed Downlink Packet Access) for connection with a wireless network.

The network interface unit 232 provides an interface for connecting the image display apparatus 200 to a wired or wireless network including an internet network. The network interface unit 232 may be provided with an Ethernet terminal for accessing a wired network, and may utilize a communication standard such as WLAN (Wireless LAN) (Wi-Fi), Wibro (Wireless broadband), Wimax (World Interoperability for Microwave Access) and HSDPA (High Speed Downlink Packet Access) for accessing a wireless network.

The network interface unit 232 may transmit or receive data to/from other user or other electronic device, through an accessed network or other network linked to an accessed network. Especially, the network interface unit 232 may transmit some of contents data stored in the image display apparatus 200, to a user or an electronic device selected from a plurality of users or electronic devices pre-registered in the image display apparatus 200.

The network interface unit 232 may access a predetermined web page through an accessed network or other network linked to an accessed network. More concretely, the network interface unit 232 may access a predetermined web page through a network thus to perform data transmission or data reception with a corresponding server. Also, the network interface unit 232 may receive contents or data provided from a contents provider or a network operator. More concretely, the network interface unit 232 may receive contents of a film, an advertisement, a game, a VOD, a broadcasting signal, etc. provided from a contents provider or a network provider through a network, and information relating to the contents. The network interface unit 232 may receive update information and an update file of a firmware provided from a network operator. The network interface unit 232 may transmit data to an internet or contents provider or a network operator.

And, the network interface unit 232 may receive, through a network, a desired application by selecting from applications open to the public.

Hereinafter, a method of transmitting and receiving car status information using the components of the mobile terminal 100 and the image display apparatus 200 mounted in the car.

Car status information may include speed, driving mode, fuel quantity, door lock/unlock state, etc. of the car in which the image display apparatus 200 is mounted.

Accordingly, the image display apparatus 200 mounted in the car may receive car status information from the car and transmit the car status information to the mobile terminal 100. The mobile terminal 100 which receives the car status information may display the car status information on the display 151 or provide a user interface for enabling the user to control the car according to the state information.

In the car status information transmission system of the present invention, the car status information may be transmitted from the image display apparatus 200 to the mobile terminal 100 using virtual network computing (VNC).

VNC is a remote frame buffer (RFB) protocol for sharing a frame buffer between remote devices. If a client requests the content of a current frame buffer over a network, a server captures and sends the frame buffer over the network in a graphic format understood by the client. Thus, both devices share a screen.

VNC may transmit data together with or separately from the frame buffer content, that is, screen information. In the present invention, car status information is transmitted using VNC.

In the present specification, transmission of car status information from the image display apparatus 200 to the mobile terminal 100 using VNC is referred to as a VNC service.

Figure 4:
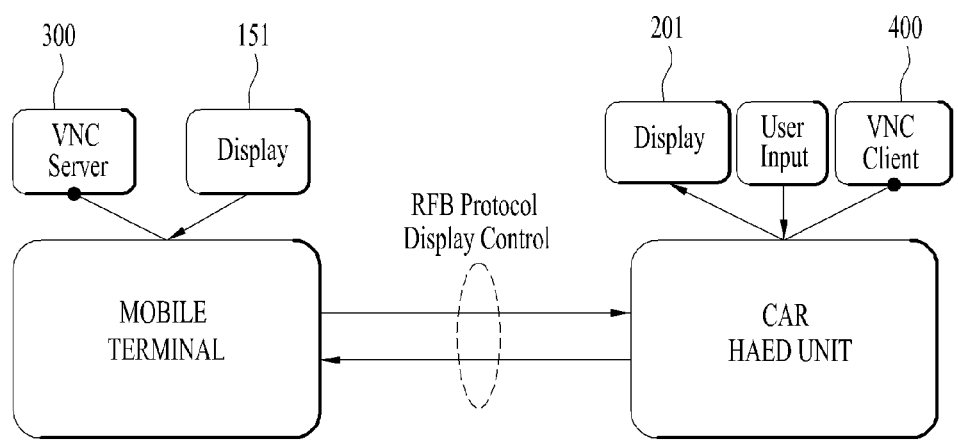
FIG. 4 is a diagram showing a data transmission system using a VNC service according to a first embodiment of the present invention.

FIG. 4 is a diagram showing a data transmission system using a VNC service according to a first embodiment of the present invention.

The mobile terminal 100 includes a VNC server 300 for performing the VNC service and a display 151 for displaying a transmitted screen to a user. The image display apparatus 200 mounted in the car includes a VNC client 400 for performing the VNC service and a display 201 for displaying a transmitted screen to the user.

The VNC server 300 and the VNC client 400 of the present invention may be implemented by controllers 180 and 212 of the respective devices or stand-alone software modules.

The VNC server 300 and the VNC client 400 perform the VNC service for transmitting screen information and car status information of the mobile terminal 100 or the image display apparatus 200 using VNC.

As described above, in order to perform the VNC service, first, the VNC server 300 and the VNC client 400 transmit screen information and display control information of one device to another device using an RFB protocol for sharing a frame buffer between remote devices.

The display control information of the present invention may include information related to a transmitted screen, frame buffer information of each device, etc.

The VNC client 400 may transmit the car status information to the VNC server 300.

Hereinafter, the VNC service of the present invention will be described.

Figure 5:
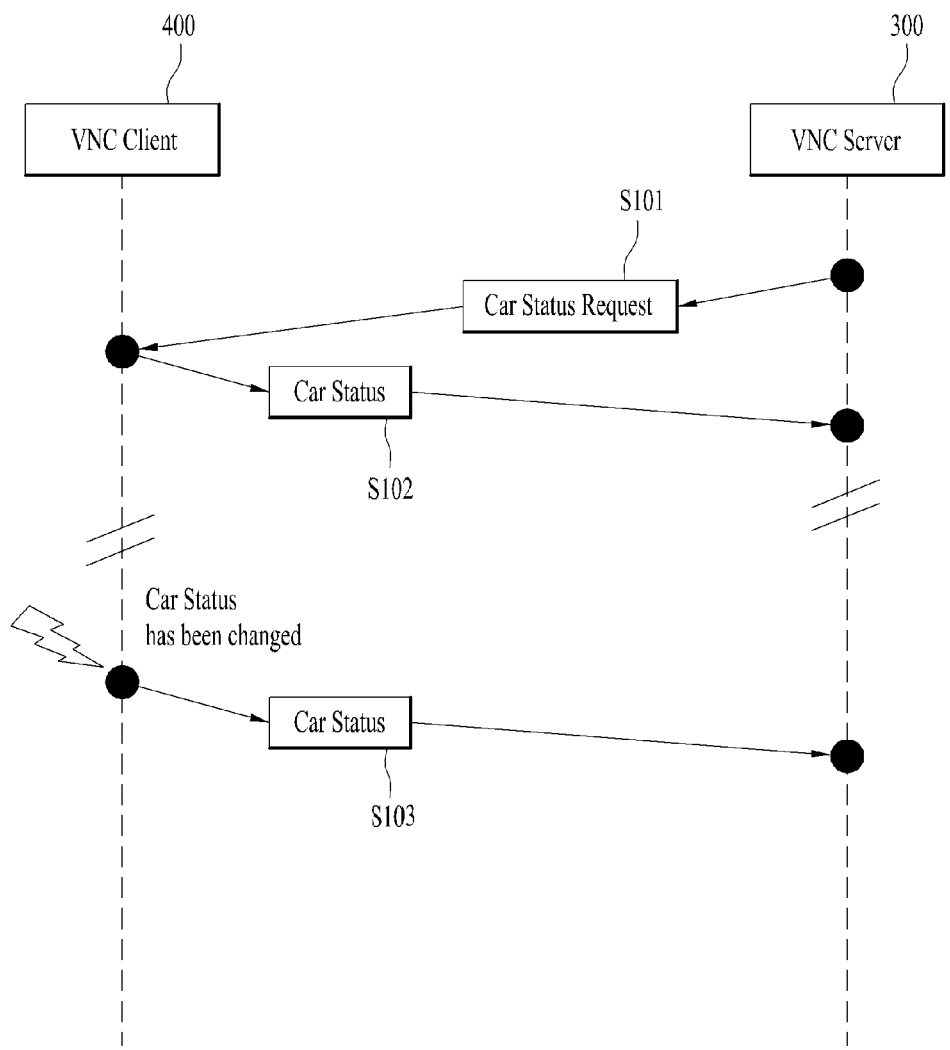
FIG. 5 is a diagram showing a method of transmitting car status information between an image display apparatus and a mobile terminal according to a first embodiment of the present invention.

FIG. 5 is a diagram showing a method of transmitting car status information between the image display apparatus 200 and the mobile terminal 100 according to a first embodiment of the present invention.

In the VNC service for transmitting the car status information from the image display apparatus 200 mounted in the car to the mobile terminal 100, the VNC server 300 of the mobile terminal 100 requests the car status information from the VNC client 400 of the image display apparatus 200 (Car Status Request) or the VNC client 400 transmits the car status information (car status) to the VNC server 300 if the car status has changed.

The VNC service of the present invention may be performed through steps shown in the drawings and, hereinafter, the VNC service of the present invention will be described in detail with reference to the drawings.

First, the VNC server 300 transmits a car status request message for requesting the car status information to the VNC client 400 if the car status information is necessary (S101).

The VNC client 400 which receives the car status request message from the VNC server 300 generates current car status information and transmits a car status message including the generated car status information to the VNC server 300 (S102).

The car status message may include a variety of information for the VNC service together with the current car status information, which will be described in greater detail with reference to FIG. 6 and subsequent figures thereof.

The VNC server 300 which receives the car status message may display the car status information on the display 151 of the mobile terminal 100 or provide a user interface for enabling the user to control the car according to the car status information.

If the car status has changed, the VNC client 400 generates current car status information and transmits a car status message including the generated car status information to the VNC server 300 (S103).

That is, if the user needs to be informed of change in the car status, that is, if a driving mode has changed or a speed has changed, the VNC client 400 generates and transmits changed car status information to the VNC server 300.

Accordingly, the VNC client 400 may generate car status information and transmit a car status message including the generated car status information to the VNC server 300, even when the car status request message is not received from the VNC server 300.

As described above, in the VNC service of the present invention, the VNC server 300 and the VN client 400 transmit and receive various messages so as to perform the VNC service. Hereinafter, the messages used in the VNC service of the present invention will be described.

FIG. 6 is a diagram showing a VNC extension message according to a first embodiment of the present invention.

The VNC extension message is a variety of control information for sharing car status information and screen information of the mobile terminal 100 and may include various messages shown in FIG. 6.

Among others, "Server/Client Display Configuration" is a variety of information of a frame buffer of the mobile terminal 100 or the image display apparatus 200 and includes information about direction change, up/down scaling, empty framebuffer update message handling, framebuffer alternative text support, supportable pixel format, physical size of a device, distance from a user, etc.

"Event Configuration" includes language setting of a keyboard or a UI, information of various hard keys (a knob, an ITU key, a virtual keyboard, etc.) and event setting information (single/multitouch, a total number of times of input upon multitouch, and an input type such as pressure).

"Event Mapping" includes input function activation request and processing information of a hard key event.

"Device Status" is device state information and includes key/touch input possibility, a lock/unlock status, a screen saver mode, a night mode, voice input, driver disturbance, current horizontal/vertical angle information of a frame buffer, etc. of the mobile terminal 100 or the image display apparatus 200.

"Framebuffer/Audio Blocking Notification" includes message information indicating that a frame buffer/audio is blocked.

"Touch Event" includes multitouch input information.

The VNC extension message of the present invention includes "Car Status" and "Car Status Request" for sharing the car status information.

"Car Status Request" is a message for requesting car status information. The VNC server 300 transmits a car status request message to the VNC client 400 if the car status information is necessary. "Car Status Request" will be described in detail with reference to FIG. 9.

"Car Status" is a message including current car status information. The VNC client 400 transmits the car status information to the VNC server 300 through the car status message. "Car Status" will be described in detail with reference to FIGS. 7 to 8.

"Car Status" may include a base type or extension type message. FIG. 7 shows a base type car status message and FIG. 8 shows an extension type car status message.

FIG. 7 is a diagram showing a car status message according to a first embodiment of the present invention.

As shown, the car status message includes "Message-type", "Extension-type", "Payload length" and "Car Status".

"Message-type" includes information indicating a car status message.

"Extension-type" includes information indicating whether or not the car status is extended. Car Status of FIG. 7 includes information indicating the base type car status.

"Payload length" includes data size information of the transmitted car status message.

"Car Status" includes information indicating whether or not the car is driven. For example, "Car Status" has a value of "0" if the car is not driven and has a value of "1" if the car is driven.

FIG. 8 is a diagram showing an extended car status message according to a first embodiment of the present invention.

As shown, the extended car status message includes "Message-type", "Extension-type", "Payload length", "Car Status", "Door Lock Status" and "Window Status".

As described above, "Message-type" includes information indicating a car status message. "Extension-type" includes information indicating whether or not the car status is extended. "Car Status" of FIG. 8 includes information indicating the extension type car status. "Payload length" includes data size information of the transmitted car status message.

"Car Status" includes "Driving", "Fasten Seat belt", "Side Brake", "Headlight", "Current Speed", "Fuel", "Transmission", and "Door Number".

"Driving" includes the driving status information of the car, that is, includes information indicating whether the car is stopped or driven. For example, "Driving" has a value of "0" if the car is stopped and has a value of "1" if the car is driven.

"Fasten Seat belt" includes the seat belt information of the car. That is, "Fasten Seat belt" includes information indicating whether the seat belt of the car is fastened. For example, "Fasten Seat belt" may have a value of "1" if all seat belts are fastened and, otherwise, have a value of "0".

"Side Brake" includes the side brake information of the car. That is, "Side Brake" includes information indicating whether the side brake of the car is locked or unlocked. For example, "Side Brake" may have a value of "1" if the side brake of the car is locked and have a value of "0" if the side brake of the car is unlocked.

"Headlight" includes the headlight status information of the car. That is, "Headlight" includes whether the headlight of the car is turned on. For example, "Headlight" may have a value of "1" if the headlight of the car is turned on and have a value of "0" if the headlight of the car is turned off.

"Current Speed" includes the current speed information of the car. For example, "Current Speed" may have a value of "00b" if the speed of the car is less than 20 km/h, have a value of "01b" if the speed of the car is in a range of 20 to 40 km/h, have a value of "10b" if the speed of the car is in a range of 40 to 60 km/h, and have a value of "11b" if the speed of the car is greater than 60 km/h.

"Fuel" includes the current fuel status information of the car. For example, "Fuel" may have a value of "00b" if the fuel of the car is not present, have a value of "01b" if the fuel of the car is less than ⅓, have a value of "10b" if the fuel of the car is in a range of ⅓ to ⅔, and have a value of "11b" if the fuel of the car is greater than ⅔.

"Transmission" includes car transmission status information. For example, "Transmission" may have a value of "00b" if the transmission mode of the car is a P mode, have a value of "01b" if the transmission mode of the car is an N mode, have a value of "10b" if the transmission mode of the car is a D mode, and have a value of "11b" if the transmission mode of the car is an R mode.

"Door Number" includes information about the number of doors of the car.

"Door Index" includes identification of the door of the car and "Door Lock Status" includes information indicating whether the door corresponding to "Door Index" is locked. For example, "Door Lock Status" may have a value of "0" if the door is locked and have a value of "1" if the door is unlocked.

"Window Index" includes identification of the window of the car and "Window Status" includes information indicating whether the window is opened. For example, "Window Status" may have a value of "1" if the window is opened and have a value of "0" if the window is closed.

FIG. 9 is a diagram showing a car status request message according to a first embodiment of the present invention.

"Car Status Request" is a message for requesting car status information. The VNC server 300 transmits a car status request message to the VNC client 400 if car status information is necessary.

As shown, the car status request message includes "Message-type", "Extension-type" and "Payload length".

"Message-type" includes information indicating a car status request message.

"Extension-type" includes type information of the car status requested to the VNC client 400, that is, information indicating whether the car status requested from the VNC server 300 to the VNC client 400 is the base type car status of FIG. 7 or the extension type car status of FIG. 8.

"Payload length" includes data size information of the transmitted car status request message.

Accordingly, the VNC server 300 and the VNC client 400 transmit and receive the car status message and the car status request message and provide the VNC service.

In the car status information transmission system of the present invention, the car status information may be transmitted from the image display apparatus 200 to the mobile terminal 100 using a Universal Plug and Play (UPnP).

UPnP is technology for establishing connection between devices in the same subnet and automatically connects another device supporting UPnP if a device is added to a local network. Examples of the main functions of UPnP include a device advertisement function for automatically finding specific resource over a local network, a service action invocation function for remotely executing a specific function of a specific device or requesting information and a data subscription function for exchanging an event between devices.

In the present specification, transmission of car status information from the image display apparatus 200 to the mobile terminal 100 using UPnP is referred to as a UPnP service.

Figure 10:
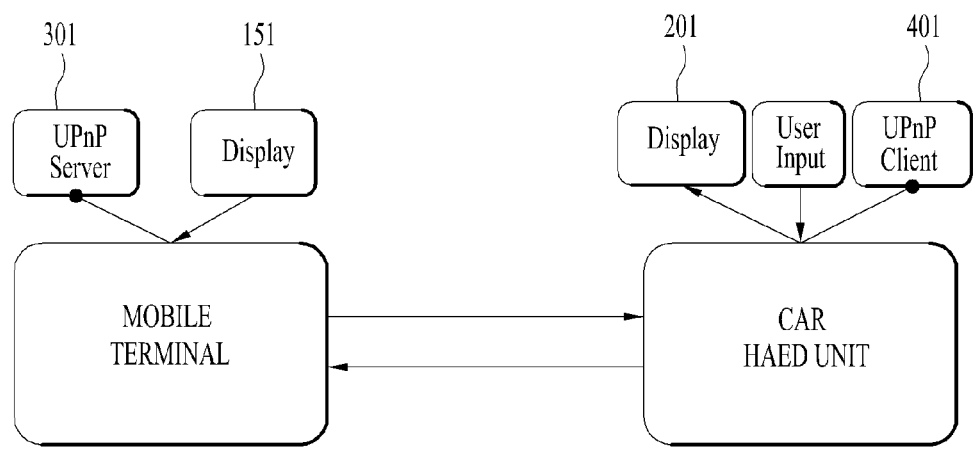
FIG. 10 is a diagram showing a data transmission system using a UPnP service according to a second embodiment of the present invention.

FIG. 10 is a diagram showing a data transmission system using a UPnP service according to a second embodiment of the present invention.

In FIG. 10, the image display apparatus 200 and the mobile terminal 100 are connected via UPnP.

The mobile terminal 100 includes a UPnP server 301 for performing the UPnP service and a display 151 for displaying a transmitted screen to a user, and the image display apparatus 200 mounted in the car includes a UPnP client 401 for providing the UPnP service and a display 201 for displaying a transmitted screen to a user.

The UPnP server 301 and the UPnP client 401 of the present invention may be implemented by controllers 180 and 212 of the respective devices or stand-alone software modules.

The UPnP server 301 and the UPnP client 401 perform the UPnP service for transmitting car status information from the image display apparatus 200 to the mobile terminal 100 using UPnP.

That is, the UPnP client 401 may transmit the car status information to the UPnP server 301.

Hereinafter, the UPnP service of the present invention will be described in detail.

Figure 11:
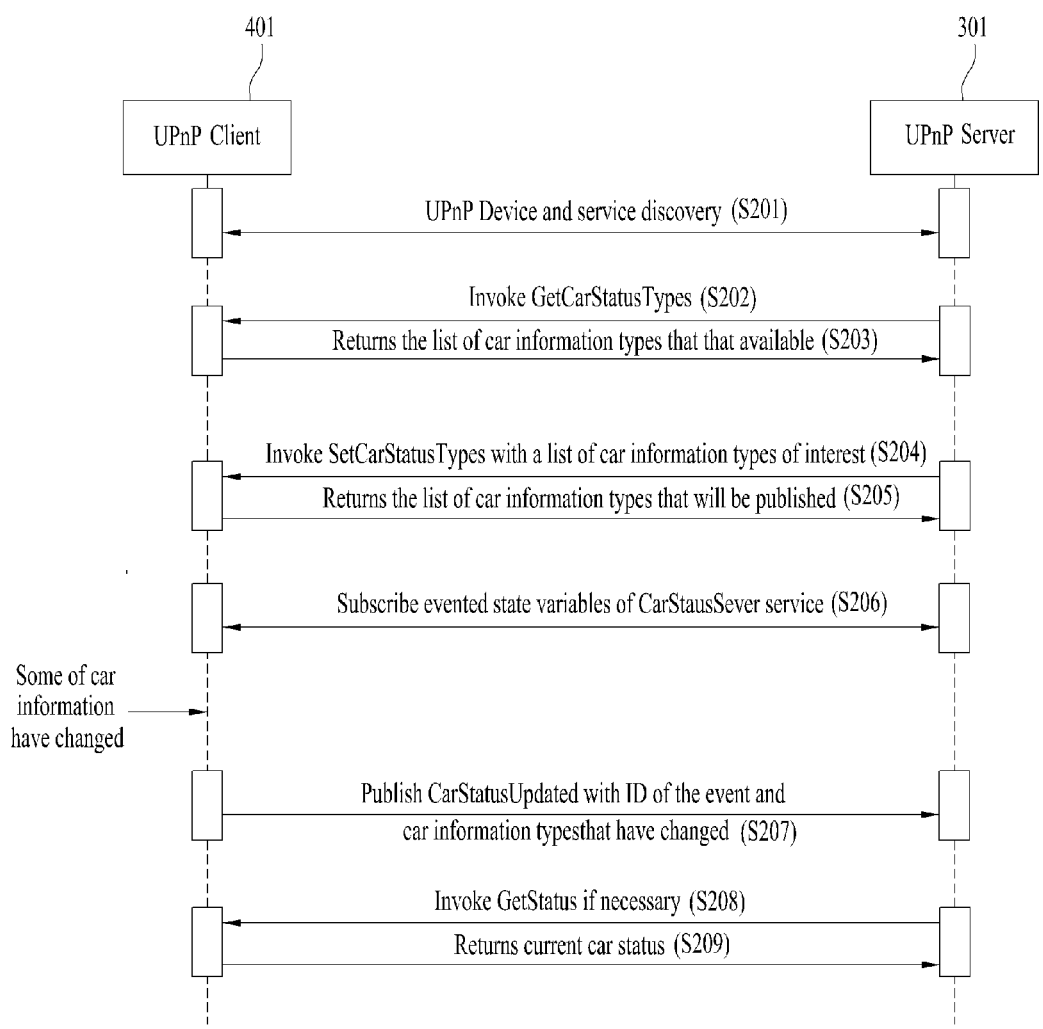
FIG. 11 is a diagram showing a method of transmitting car status information between an image display apparatus and a mobile terminal according to a second embodiment of the present invention.

FIG. 11 is a diagram showing a method of transmitting car status information between an image display apparatus and a mobile terminal according to a second embodiment of the present invention.

In the UPnP service for transmitting the car status information from the image display apparatus 200 mounted in the car to the mobile terminal 100, the UPnP server 301 of the mobile terminal 100 requests the car status information from the UPnP client 401 of the image display apparatus 200 or the UPnP client 401 transmits the car status information to the UPnP server 301 if the car status information has changed.

The UPnP service of the present invention may be performed through steps shown in the drawings and, hereinafter, the UPnP service of the present invention will be described in detail with reference to the drawings.

First, the UPnP server 301 searches for the UPnP client 401 located in the same subnet and adds and connects the searched UPnP client 401 to a local network (UPnP device and service discovery, S201).

The UPnP server 301 requests a list of car status information transmittable by the UPnP client 401 from the UPnP client 401 (Invoke GetCarStatusTypes, S202). That is, the UPnP server 301 requests car status information transmittable by the currently connected UPnP client 401 of a variety of car status information.

The UPnP client 401 transmits the list of the car status information transmittable by the UPnP client 401 to the UPnP server 301 (return the list of car information types that available, S203).

The UPnP server 301 transmits the list of the car status information, which is desired to be received, of the car status information transmittable by the UPnP client 401 to the UPnP client 401 (Invoke SetCarStatusTypes with a list of car information types of interest, S204).

The UPnP client 401 transmits, to the UPnP server 301, the list of the car status information to be transmitted to the UPnP server 301 (Return the list of car information types that will be published, S205).

The UPnP client 401 transmits the car status information to the UPnP server 301 (Subscribe evented state variables of CarStatusServer service, S206). In this case, the UPnP client 401 may not transmit all car status information, but may transmit only changed car status information to the UPnP server 301.

If the car status has changed, the UPnP client 401 may transmit information indicating that the current car status has changed to the UPnP server 301 together with identification of the changed car status information (Publish CarStatusUpdated with ID of the event and car information types that have changed, S207).

That is, if the user needs to be informed of change in the car status, that is, if a driving mode has changed or a speed has changed, the UPnP client 401 generates and transmits the changed car status information to the UPnP server 301.

Accordingly, the UPnP client 401 may transmit the changed car status information to the UPnP server 301, even when the car status request message is not received from the UPnP server 301.

In contrast, the UPnP server 301 may request the car status information from the UPnP client 401 if update of the car status information is necessary, that is, if a user request is present (Invoke GetStatus if necessary, S208).

Then, the UPnP Client 401 transmits the current car status information to the UPnP server 301 (Return current car status, S209).

As described above, in the UPnP service of the present invention, the UPnP server 301 and the UPnP client transmit and receive various actions and variables so as to perform the UPnP service. Hereinafter, the actions and the variables used in the UPnP service of the present invention will be described.

First, the variables used in the UPnP service will be described with reference to FIGS. 12 to 13.

FIG. 12 is a diagram showing status variables according to a second embodiment of the present invention.

"Status Variables" used in the UPnP service are various control variables for sharing the car status information and may include various variables shown in FIG. 12.

"Status Variables" include "CarStatusUpdated", "CarStatus" and "ProfileID".

"CarStatusUpdated" is a variable including a list of changed car status information of the car status information.

"CarStatus" is a variable including the car status information, which will be described in detail below with reference to FIG. 13.

"ProfileID" is a variable including identification of transmitted/received car status information.

In the figure, String is a string variable, INT is an integer variable, and Bool is a Boolean variable.

FIG. 13 is a diagram showing "CarStatus Variables" according to a second embodiment of the present invention.

As shown, the "CarStatus Variables" which are car status information include "DrivingMode", "Speed", "Transmission", "SideBrake", "Headlight", "Fuel", "SeatBelt", and "DoorLock".

"DrivingMode" includes the driving status information of the car, that is, includes information indicating whether the car is stopped or driven. For example, "DrivingMode" is Bool which has a value of "0b" if the car is stopped and has a value of "1b" if the car is driven.

"Speed" includes the speed information of the car. For example, "Speed" is INT which may include a current car speed value.

"Transmission" includes the transmission status information of the car. For example, "Transmission" is INT which may have a value of "0" if the transmission mode of the car is a P mode, have a value of "1" if the transmission mode of the car is an N mode, have a value of "2" if the transmission mode of the car is a D mode, and have a value of "3" if the transmission mode of the car is an R mode.

"Side Brake" includes the side brake information of the car. That is, "Side Brake" includes information indicating whether the side brake of the car is locked or unlocked. For example, "Side Brake" is Bool which may have a value of "1" if the side brake of the car is locked and have a value of "0" if the side brake of the car is unlocked.

"Headlight" includes the headlight status information of the car. That is, "Headlight" includes whether the headlight of the car is turned on. For example, "Headlight" is Bool which may have a value of "1" if the headlight of the car is turned on and have a value of "0" if the headlight of the car is turned off.

"Fuel" includes the current fuel status information of the car. For example, "Fuel" is a String which may include percent information of the fuel of the car.

"SeatBelt" includes the seat belt information of the car. That is, "SeatBelt" includes information indicating whether the seat belt of the car is fastened. For example, "SeatBelt" is String which may have information about whether all seat belts of the car are fastened.

"DoorLock" includes the door status information of the car. "DoorLock" includes information indicating whether the door of the car is locked. For example, "DoorLock" is String which may include information indicating whether all doors of the car are locked.

Hereinafter, the actions of the UPnP service using the above-described variables will be described with reference to FIGS. 14 to 17.

FIG. 14 is a diagram showing actions of a UPnP service according to a second embodiment of the present invention.

As shown, the actions of the UPnP service include "GetCarStatusTypes", "SetCarStatusTypes" and "GetCarStatus".

First, the "GetCarStatusTypes" action provides a list of transmittable car status information. The UPnP server 301 may request car status information provided by the UPnP client 401 from the UPnP client 401 using the "GetCarStatusTypes" action. The "GetCarStatusTypes" action will be described in detail below with reference to FIG. 15.

The "SetCarStatusTypes" action provides a list of car status information which is desired to be received. The UPnP server 301 may transmit, to the UPnP client 401, the list of car status information which is desired to be received from the UPnP client 401 using the "SetCarStatusTypes" action. The "SetCarStatusTypes" action will be described in detail below with reference to FIG. 16.

The "GetCarStatus" action provides car status information. The UPnP server 301 may request the car status information from the UPnP client 401 using the "GetCarStatus" action. The "GetCarStatus" action will be described in detail below with reference to FIG. 17.

FIG. 15 is a diagram showing the "GetCarStatusTypes" action according to a second embodiment of the present invention.

As described above, the "GetCarStatusTypes" action provides the list of transmittable car status information. The "GetCarStatusTypes" action includes "StatusTypeFilter" and "ProfileID" as an input variable and "StatusTypes" as an output variable.

"StatusTypeFilter" includes a list of all car status information. For example, if "StatusTypeFilter" is set to "*" or "null", it indicates that all car status information is requested.

"ProfileID" includes identification of the car status information provided through the "GetCarStatusTypes" action.

"StatusTypes" includes a list of transmittable car status information.

Accordingly, the UPnP server 301 may request the car status information capable of being provided by the UPnP client 401 from the UPnP client 401 using the "GetCarStatusTypes" action.

FIG. 16 is a diagram showing the "SetCarStatusType" action according to a second embodiment of the present invention.

As described above, the "SetCarStatusTypes" action provides the list of car status information which is desired to be received. The "SetCarStatusTypes" action includes "StatusTypes" and "ProfileID" as an input variable and "StatusTypesResult" as an output variable.

"StatusTypes" includes a list of car status information which is desired to be received.

"ProfileID" includes identification of the car status information provided through the "SetCarStatusTypes" action.

"StatusTypesResult" includes a list of car status information to be transmitted.

Accordingly, the UPnP server 301 may transmit, to the UPnP client 401, the list of the car status information which is desired to be received from the UPnP client 401, using the SetCarStatusTypes" action.

FIG. 17 is a diagram showing the "GetCarStatus" action according to a second embodiment of the present invention.

As described above, the "GetCarStatus" action provides the car status information. The "GetCarStatus" action includes "StatusTypeFilter" as an input variable and "StatusTypes" as an output variable.

"StatusTypeFilter" includes a list of all car status information. For example, if "StatusTypeFilter" is set to "*" or "null", it indicates that all car status information is requested.

"CarStatus" is car status information, which was described in detail with reference FIG. 13.

Accordingly, the UPnP server 301 may request the car status information from the UPnP client 401 using the "GetCarStatus" action.

According to a mobile terminal, an image display apparatus mounted in a vehicle and a data processing method using the same of the present invention, it is possible to efficiently transmit car status information between the mobile terminal and the image display apparatus. In addition, it is possible to provide various user interfaces suitable for a car state to a user using the transmitted car status information.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An image display apparatus mounted in a car, comprising:
   a communication unit configured to transmit and receive data to and from a mobile terminal by using a UPnP (Universal Plug and Play) service; and
   a controller configured to:
      control the communication unit to receive information for requesting a list of transmittable car status information, transmit a list of transmittable car status information to the mobile terminal, and receive information for requesting status information of the car among the list of transmittable car status information, in which the image display apparatus is mounted, from the mobile terminal,
      generate car status information according to the received information for requesting the status information of the car, and
      control the communication unit to transmit the generated car status information to the mobile terminal,
   wherein the car status information includes at least one of driving information, speed information and fuel information of the car.

2. The image display apparatus according to claim 1, wherein the controller controls the communication unit to generate and transmit the car status information to the mobile terminal, if the status of the car is changed.

3. The image display apparatus according to claim 1, wherein the controller controls the communication unit to generate and transmit only changed car status information to the mobile terminal if the status of the car is changed.

4. The image display apparatus according to claim 1, wherein the car status information further includes transmission information, brake lock/unlock information and headlight on/off information of the car.

5. The image display apparatus according to claim 1, wherein the car status information further includes information on whether a seat belt is fastened, information on whether a door is locked and information on whether a window is opened.

6. The image display apparatus according to claim 1, wherein the controller controls the communication unit to receive first type information including a list of the car status information requested by the mobile terminal and generates the car status information according to the type information.

7. The image display apparatus according to claim 1, wherein the controller controls the communication unit to generate and transmit, to the mobile terminal, second type information including a list of car status information capable of being, generated.

8. The image display apparatus according to claim 1, wherein the car status information includes identification of the car status information.

9. A mobile terminal comprising:
   a communication unit configured to transmit and receive data to and from an image display apparatus by using a UPnP(Universal Plug and Play) service; and
   a controller configured to:
      request a list of transmittable car status information,
      receive a list of transmittable car status information from the car,
      generate information for requesting status information of a car mounted with the image display apparatus among the list of transmittable car status information,
      control the communication unit to transmit the generated information for requesting the status information of the car, and
      control the communication unit to receive car status information generated according to the information for requesting the status information of the car,
   wherein the car status information includes at least one of driving information, speed information and fuel information of the car.

10. The mobile terminal according to claim 9, wherein the controller controls the communication unit to receive the car status information from the image display apparatus, if the status of the car is changed.

11. The mobile terminal according to claim 9, wherein the controller controls the communication unit to receive only changed car status information from the image display apparatus if the status of the car is changed.

12. The mobile terminal according to claim 9, wherein the car status information further includes transmission information, brake lock/unlock information and headlight on/off information of the car.

13. The mobile terminal according to claim 9, wherein the car status information further includes information on whether a seat belt is fastened, information on whether a door is locked and information on whether a window is opened.

14. The mobile terminal according to claim 9, wherein the controller generates first type information including a list of the car status information requested by the mobile terminal and controls the communication unit to transmit the first type information to the image display apparatus.

15. The mobile terminal according to claim 9, wherein the controller controls the communication unit to receive second type information including a list of car status information capable of being generated from the image display apparatus.

16. The mobile terminal according to claim 9, wherein the car status information includes identification of the car status information.

* * * * *